United States Patent
Sistla et al.

(10) Patent No.: US 8,169,850 B2
(45) Date of Patent: May 1, 2012

(54) FORMING MULTIPROCESSOR SYSTEMS USING DUAL PROCESSORS

(75) Inventors: Krishnakanth Sistla, Hillsboro, OR (US); Ganapati Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 12/430,242

(22) Filed: Apr. 27, 2009

(65) Prior Publication Data

US 2010/0274975 A1     Oct. 28, 2010

(51) Int. Cl.
 G11C 8/00      (2006.01)
 G06F 13/00    (2006.01)
 G06F 1/12      (2006.01)

(52) U.S. Cl. ............. 365/233.1; 711/146; 710/311; 710/312

(58) Field of Classification Search ............ 365/194, 365/233.1; 711/146, E12.001, E12.033; 710/311, 312, 241
See application file for complete search history.

(56) References Cited

U.S. PATENT DOCUMENTS

| | | | |
|---|---|---|---|
| 6,009,488 A | 12/1999 | Kavipurapu | |
| 6,501,999 B1 | 12/2002 | Cai | |
| 6,630,731 B2 | 10/2003 | Miyamoto | |
| 6,718,475 B2 | 4/2004 | Cau | |
| 6,721,840 B1 | 4/2004 | Allegrucci | |
| 6,910,092 B2 | 6/2005 | Calvignac | |
| 7,234,017 B2 | 6/2007 | Biran | |
| 7,437,587 B2 * | 10/2008 | Campbell | 713/375 |
| 2002/0051427 A1 | 5/2002 | Carvey | |
| 2003/0145149 A1 | 7/2003 | Nagano | |
| 2004/0250003 A1 * | 12/2004 | Chang | 710/107 |
| 2005/0216641 A1 | 9/2005 | Weber et al. | |
| 2005/0259599 A1 | 11/2005 | Cherukuri | |
| 2006/0072625 A1 | 4/2006 | Shearer et al. | |
| 2006/0184706 A1 | 8/2006 | Fields | |

OTHER PUBLICATIONS

United States Patent and Trademark Office, Office Action Dated Aug. 7, 2007 with Reply to Office Action filed on Oct. 6, 2007, in a related application.
United States Patent and Trademark Office, Final Office Action Dated Jan. 16, 2008, with Request for Continued Examination and Amendment with RCE filed on Apr. 15, 2008, in a related application.
United States Patent and Trademark Office, Office Action Dated Jul. 16, 2008 with Reply to Office Action filed on Oct. 16, 2008, in a related application.
United States Patent and Trademark Office, Final Office Action Dated Dec. 22, 2008, in a related application.

* cited by examiner

*Primary Examiner* — Richard Elms
*Assistant Examiner* — Hien Nguyen
(74) *Attorney, Agent, or Firm* — Trop, Pruner & Hu, P.C.

(57) ABSTRACT

In one embodiment, link logic of a multi-chip processor (MCP) formed using multiple processors may interface with a first point-to-point (PtP) link coupled between the MCP and an off-package agent and another PtP link coupled between first and second processors of the MCP, where the on-package PtP link operates at a greater bandwidth than the first PtP link. Other embodiments are described and claimed.

14 Claims, 9 Drawing Sheets

FORMING MULTIPROCESSOR SYSTEMS USING DUAL PROCESSORS

BACKGROUND

Increased silicon efficiencies have made large scale multi-core processors possible. Multi-core processors provide performance leadership in server benchmarks as well as increased multi-tasking capabilities in the client processor space. Furthermore, systems such as dual processor (DP) systems can provide for improved processing capabilities.

However, adapting multiple cores and processors into a multiprocessor system can be quite time consuming, and can involve substantial changes from conventional uniprocessor designs. In addition, mechanisms of a given cache coherency protocol typically need to be modified to handle the presence of multiple processors. Furthermore, when implementing processors designed for a DP processor system into a multi-processor system, typically many architectural changes are needed, requiring significant design efforts and lengthening time to market.

DETAILED DESCRIPTION

Figure 1:
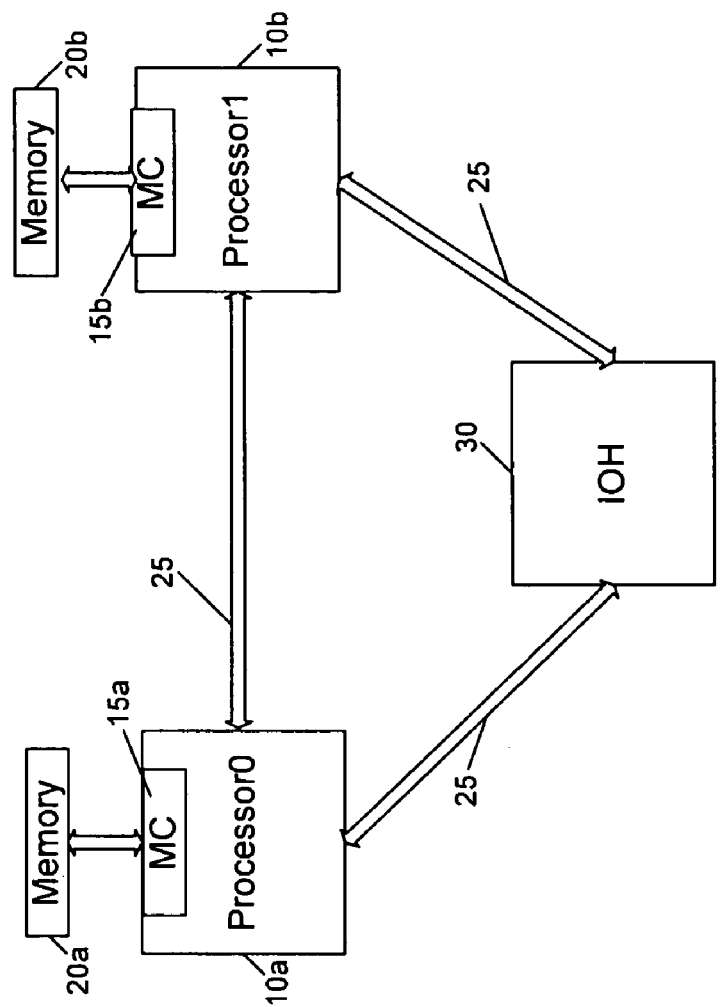
FIG. 1 is a block diagram of a dual processor system with a point-to-point (PtP) interconnect in accordance with a cache coherency protocol.

FIG. 1 is a block diagram of a dual processor (DP) system coupled with point-to-point (PtP) system interconnects in accordance with a given cache coherence protocol, such as Intel Corporation's Quickpath Interconnect (QPI) as the system interconnect. Each dual processor 10 is coupled to two PtP links 25 and includes one instance of an integrated memory controller 15. The processors are connected to an input/output hub (IOH) 30 using one link and the remaining link is used to connect the two processors. Typical dual processor implementations use source broadcasts to minimize latency.

Figure 2:
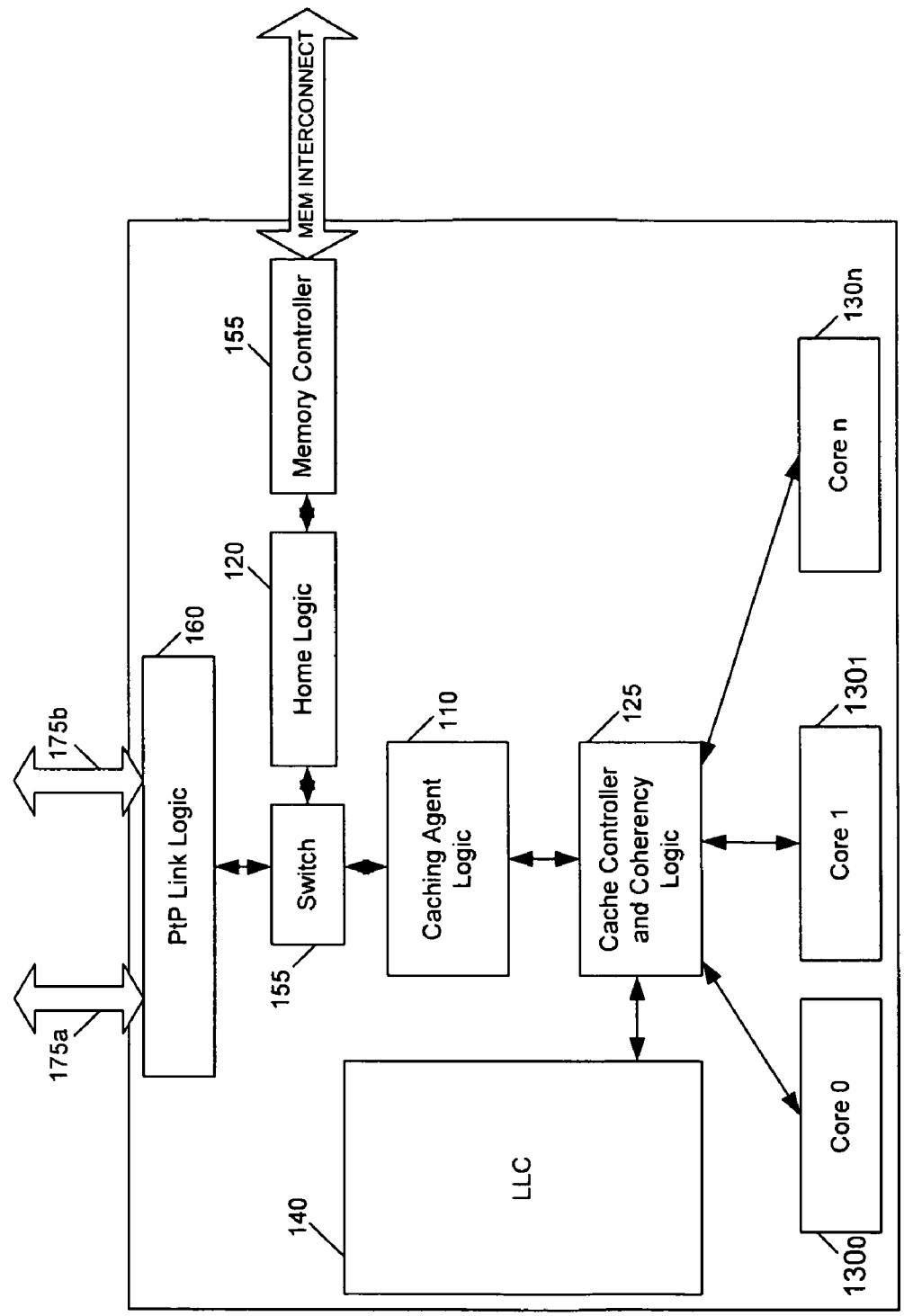
FIG. 2 is a block diagram of a processor in accordance with one embodiment of the present invention.

Referring now to FIG. 2, shown is a block diagram of a processor in accordance with one embodiment of the present invention. As shown in FIG. 2, processor 100 contains at least one caching agent logic 110 (referred to generally as a "caching agent") and one home logic 120 (referred to generally as a "home agent"). Note that the term "device" or "agent" is general and may be used to describe any electrical component coupled to a link. A "link" or "interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology). According to one embodiment, the term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, a "caching agent" is generally a cache controller that is adapted to route memory requests to the home agent. In one embodiment, home agent 120 may support up to three caching agents, one caching agent for each processor and one caching agent for an IOH write cache.

Cores 130 may be connected to a last level cache (LLC) 140 using an on-die interconnect. The cache domain including the LLC and the core caches is encapsulated by caching agent logic 110. This logic will implement the underlying cache domains as a single caching agent to the PtP coherence system. The home agent logic protecting the memory connected to a local memory controller 155 is implemented in home logic 120. Caching agent logic 110 and home agent logic 120 are connected to a link logic 160 using a switching logic 155. This switch may be a time-multiplexed logic or could be a router implementation, which provides higher bandwidth. Since the processor is a dual processor, link logic 160 supports two PtP links 175. Link logic 160 also supports multicasting among the two links 175 in order to support source broadcast-based snooping of other processors. In one embodiment, since the dual processor system is a fully connected system, only two virtual networks are supported (e.g., VN0 and VNA). Since in the dual processor system there are two home agents, the caching agent logic 110 is capable of addressing two home agents. Similarly, each home agent logic 120 can support three caching agents in total.

Figure 3A:
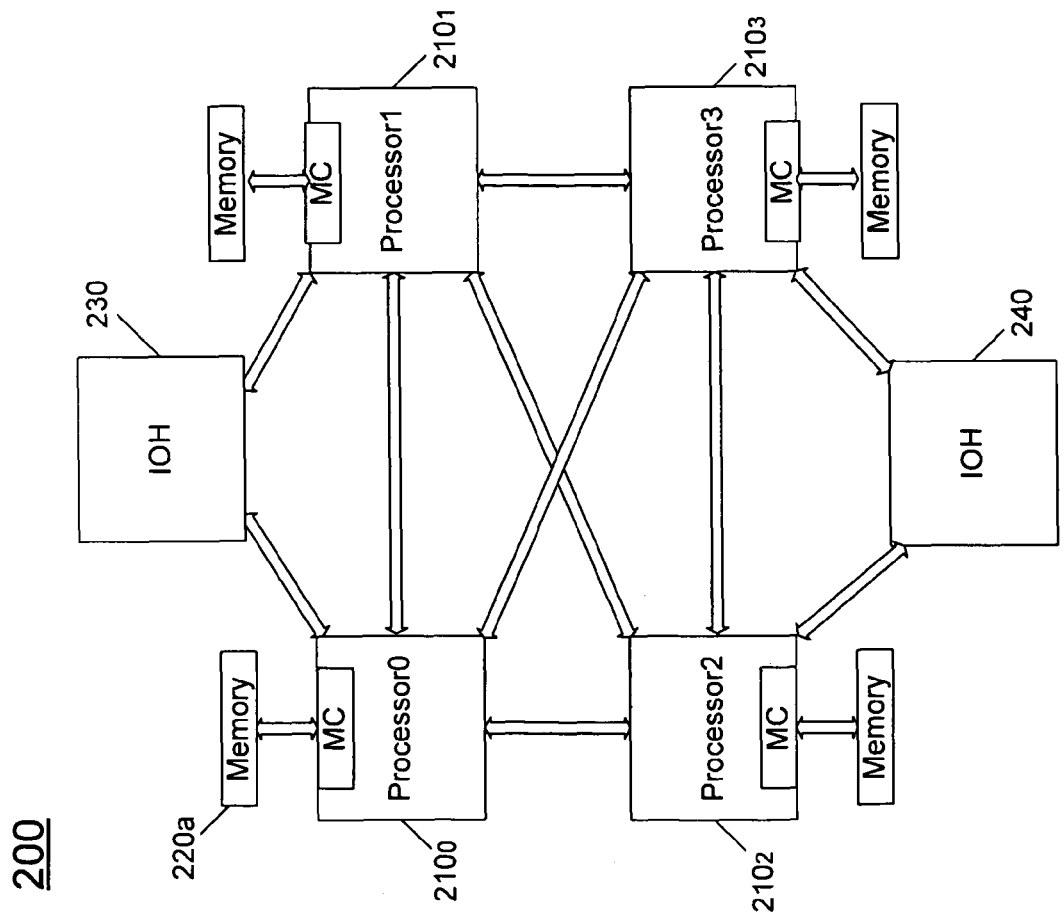
FIG. 3A is a block diagram of a partially connected quad processor system in accordance with one embodiment of the present invention.

In various embodiments, multi-chip packaging technology can be used to join two such DP processors to derive a multiprocessor (MP) processor. Referring now to FIG. 3A, shown is a block diagram of a system in accordance with one embodiment of the present invention. As shown in FIG. 3A, system 200 may be a partially connected quad processor system in which each processor 210 (each of which may include two DP processors) is coupled to each other processor via a PtP link and is coupled to a local portion of memory (e.g., dynamic random access memory (DRAM)) 220 via a memory interconnect coupled to an integrated memory controller 215 of the corresponding processor. In the partially connected system of FIG. 3A, note the presence of two IOHs 230 and 240 such that processors $210_0$ and $210_1$, are directly coupled to IOH 230 and similarly processors $210_2$ and $210_3$ are directly coupled to IOH 240. In the embodiment of FIG. 3A, each processor 210 may be implemented in a multi-chip package (MCP) such as described below with regard to FIG. 4 and may be coupled together via the PtP links that are configured as conductive traces on a circuit board (e.g., a motherboard) on which the processors and memories are adapted. Thus as shown, each processor 210 may provide support for at least four PtP links. Furthermore, there may be route-through between the PtP links to the IOHs and the remaining processor links, due to the lack of a full connection between each of the processors and the IOHs.

Figure 3B:
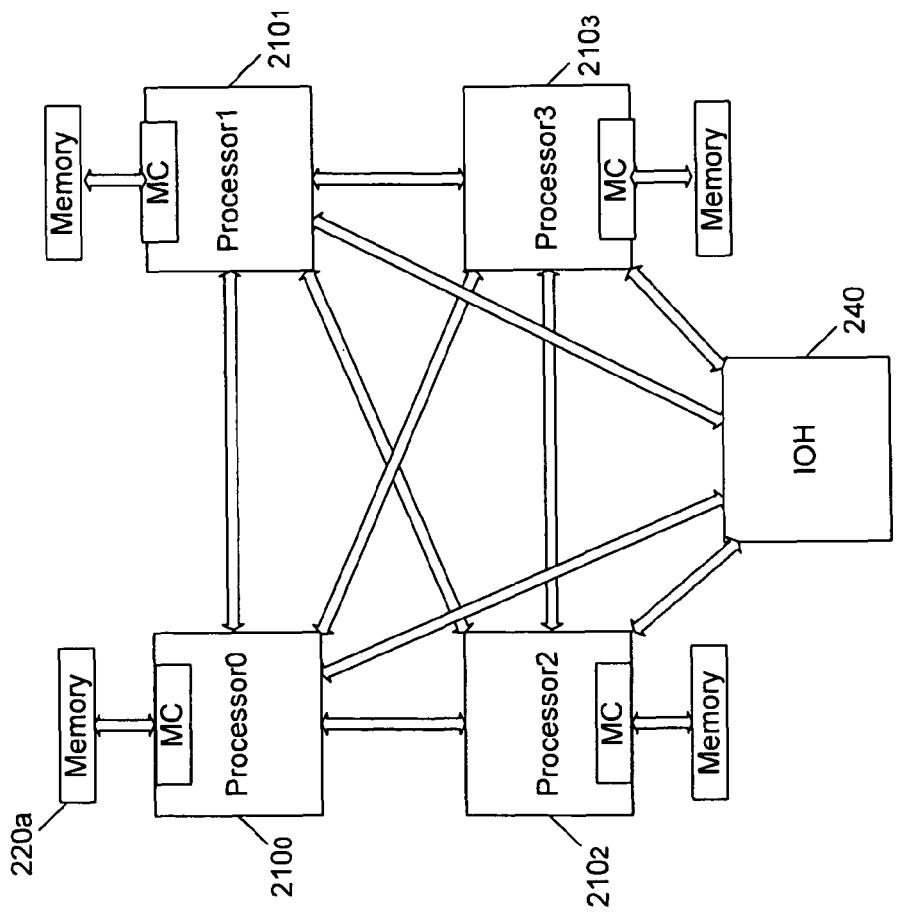
FIG. 3B is a block diagram of a fully connected quad processor system in accordance with one embodiment of the present invention.

In contrast, referring now to FIG. 3B, shown is a block diagram of a fully connected quad processor system. In the implementation of FIG. 3B, system 200' may include only a single IOH 240, to which each processor 210 is directly coupled. In this way, the need for providing route through for at least certain ones of processors 210 can be avoided. For the configuration shown in FIG. 3A there may be at least six caching agents (4 processors and 2 IOH). Similarly, the configuration in FIG. 3B may have support for at least five caching agents. The home logic in the processors may be used to support these caching agents. The caching agent logic in the processor supports at least four home agents (4 processors). This includes support in a system address decoder for addressing these home agents. To enhance time to market, all attempts are made to minimize the extent of changes to a DP processor when implemented in a MCP.

Figure 4:
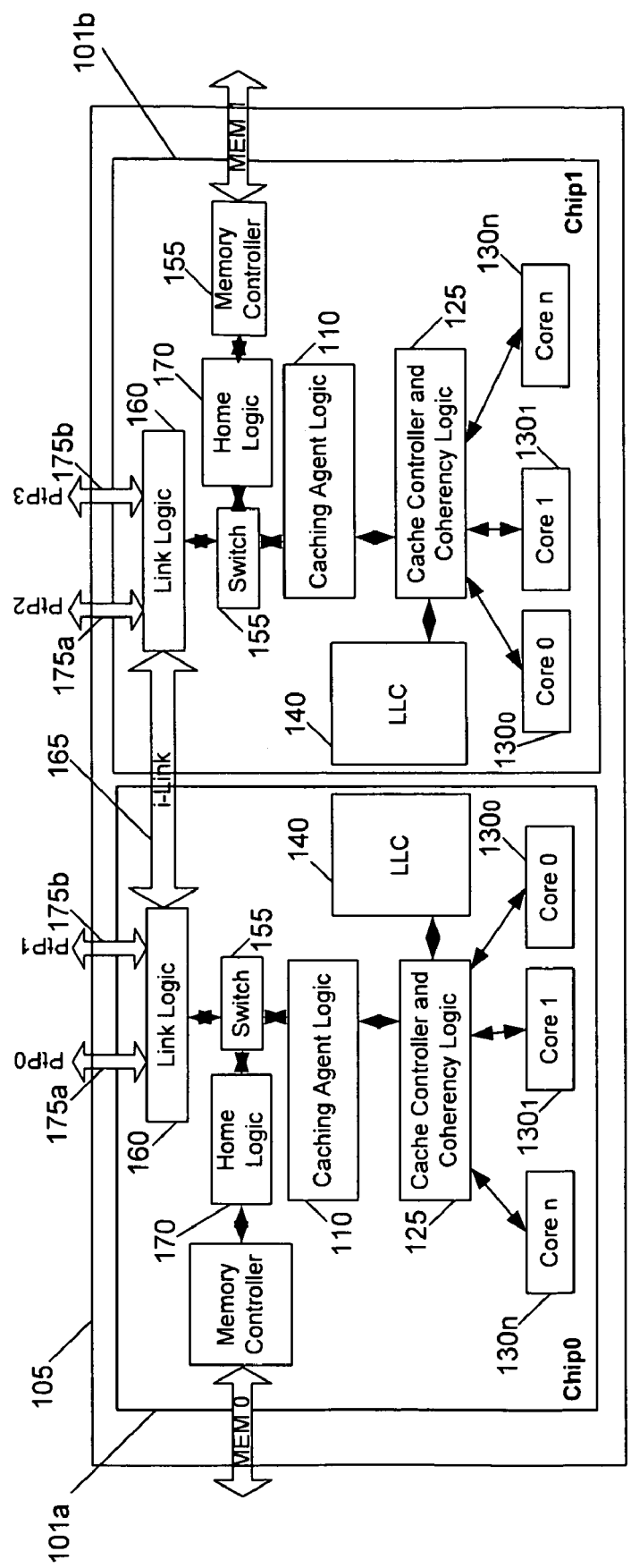
FIG. 4 is a block diagram of processors joined in a multi-chip package in accordance with one embodiment of the present invention.

Referring now to FIG. 4, shown is a block diagram of two DP processors joined in a multi-chip package 105. As shown in FIG. 4, chips 101$_a$ and 101$_b$ may be coupled by a PtP link 165. In other respects, the components within the processors may be the same as described above with regard to processor 100 of FIG. 2. As shown in FIG. 4, this third link 165 (also referred to as an "I-link", i.e., an intra-package interconnect) is added to each of the DP processors. In one embodiment, link 165 is essentially a PtP link without the electricals of a PtP physical (PHY) layer. Since the trace length is very small, a short and wider bus with source synchronous clocking can be used to reach high speeds.

In one embodiment, link 165 may be realized via interconnects present on a substrate of an MCP. That is, chips 101$a$ and 101$b$ may be coupled to the substrate, e.g., by conductive bumps or in another manner. In turn, the substrate may include conductive traces that form link 165 and thus interconnect to the bumps of the chips. Because these intra-package traces may be relatively short (i.e., as compared to off-package PtP links that couple together different packages), a wider link may be used. For example, in some embodiments, off-package PtP links may have a first width (e.g., 20 bits). The intra-package link 165 may be of at least twice this width (e.g., 40 bits). Furthermore, this wider link may operate at higher speeds, owing to the short distance of the links. In one embodiment, a flit-wide (i.e., the number of bits of a flow control unit) interface can require 162 pins on each DP processor. To limit the amount of pins needed, some embodiments may implement a half-flit wide interface, e.g., clocked at 3.2 Gigahertz (Ghz), which may provide the same bandwidth as two standard PtP links, needing only 82 pins. Since the trace length is very small, the skew and jitter on the link can be tightly controlled, thus reaching this high speed. There may be several advantages to using this joining method. First, a conventional physical (PHY) layer is designed to deal with longer trace lengths and higher bit error rates (BER). Since the trace length of I-link 165 is very small, it can reach higher bandwidths without paying the latency and power penalty of a standard PtP link. Thus the bandwidth of the intra-package link may be independent of the bandwidth of off-package links. By tuning the on-package links to a selected bandwidth for a given system, traffic can be better balanced and such links are not a limiter of bandwidth in a system.

A protocol joining method may be used to determine the number of caching agents and home agents in the system, and the mechanism by which the caching agent and home agent logic is exposed. In a DP processor, it is customary to use the same node-identifier (ID) for the caching agent and home agent. The PtP link logic ensures that appropriate messages are routed to the appropriate logic in the processors. For example, home (HOM) messages are sent to the home logic, while snoop (SNP) channel messages are sent to the caching agent logic.

For determining the number of caching agents, the simplest way to extend the coherence scheme is to treat the additional caching agent (i.e., of the other processor within the MCP) as an independent caching domain. The burden of managing coherence between the two caches is pushed to the PtP cache coherency domain. For coherence purposes this would make the systems shown in FIGS. 3A and 3B look like a eight caching agent system (i.e., 8P system). The new caching agent is visible to the other caching agents as well as to the home agent logic. This also implies that from a package viewpoint, each incoming snoop produces two responses, one from each caching agent. The home agent logic in each DP processor may support eight processor caching agents, e.g., via tracker logic and other structures.

For determining the number of home agents, it is possible to employ two techniques. The actual choice depends on the details of the caching agent logic and home agent logic in the constituent processors. As one possible implementation, a single home agent per MCP with internal interleaving may be provided. The two home agent logics could be exposed as a single home agent per MCP whose address space is partitioned into two halves. This address partitioning may represent the memory coupled to the MCP This implies that the total number of home agents in the systems shown in FIGS. 3A and 3B is four. Without interleaving, the number of trackers in each home logic would need to be doubled to balance the bandwidth per caching agent (since number of caching agents is doubled). With fine interleaving, the effective number of trackers per home agent is doubled, if these trackers are repartitioned among the double caching agents, the number of trackers per caching agent remains same as the DP processor (which may improve time to market). In one embodiment, the fine interleaving can be enforced by a hash function implemented in hardware, which may partition requests to the two home agents within the package. If the home logic is not very scalable in the number of trackers, but can take the burden of increased caching agents easily, this choice is preferred.

As another possible implementation, highly interleaved independent home agents may be provided in which the two home agent logics are exposed as two independent home agents. This would imply that in a quad processor system, there would be eight home agents. This in turn implies that the caching agent logic supports eight home agents. Note that the number of home agents supported in a DP processor is two. In order to manage the growth of the trackers in the home logic, a restriction can be placed on the system address decoder that accesses to the local memory (i.e., access in the local package) be highly interleaved. This would achieve the same effect as a single home agent with interleaving, however the caching agent change is larger. This option simplifies the routing logic in the PtP link logic, since a unique node ID can be used to address each package. If the home logic is not very scalable in the number of trackers, but can take the burden of increased caching agents easily, this choice is preferred.

Yet another possible implementation is independent home agents without interleaving restrictions. This would imply that the number of trackers in each home logic be doubled to maintain the same trackers per caching agent as the DP processor. Note that this implementation also includes the other components described above for independent home agents. If the home logic were highly scalable in the number of trackers and the number of caching agents, this choice could be employed.

The node-assignment depends on the number of home agents. If a single home agent is employed, then the MP processor would require two node-IDs, the difference being whether there is a single home agent or two home agents. Table 1 below shows two possible node assignments per the different home agent implementations described above:

TABLE 1

| Agent Index | Single Home Agent | Independent Home Agent |
|---|---|---|
| Home Agent-Chip0 | 00 | 00 |
| Home Agent-Chip1 | 00 | 01 |
| Caching Agent-Chip0 | 00 | 00 |
| Caching Agent-Chip1 | 01 | 01 |

While conventional DP processor link logic has no support for PtP route-through, since embodiments distribute four PtP links across two chips, independent of the platform topology there is a need for limited forwarding ability between the links and the chips. If the platform topology is as shown in FIG. 3B, there is no need for processor-level PTP route-through support. However if the platform topology that needs to be supported is as shown in FIG. 3A, a processor-level PTP route-through needs to be supported.

Table 2 shows the connectivity supported for the topology shown in FIG. 3A, and additional connectivity for supporting FIG. 3B is shown in italics. Boxes marked with "I" indicate that the connectivity between the agents in the corresponding row and column is not required. Boxes marked with "O" indicate that the connectivity between agents in the row and column indicated is present in a DP processor design such as that of FIG. 2. Boxes marked with "N" indicate connectivity in accordance with an embodiment of the present invention to support the topologies in both FIG. 3A and FIG. 3B. Note that boxes marked with the italic "N" are required only for supporting FIG. 3B topologies, but not required for supporting topology in FIG. 3A.

memory controller scheduling, virtual network mapping, and so forth. Lower link layer logic assembles/de-assembles flits into protocol packets and vice-versa.

Figure 5:
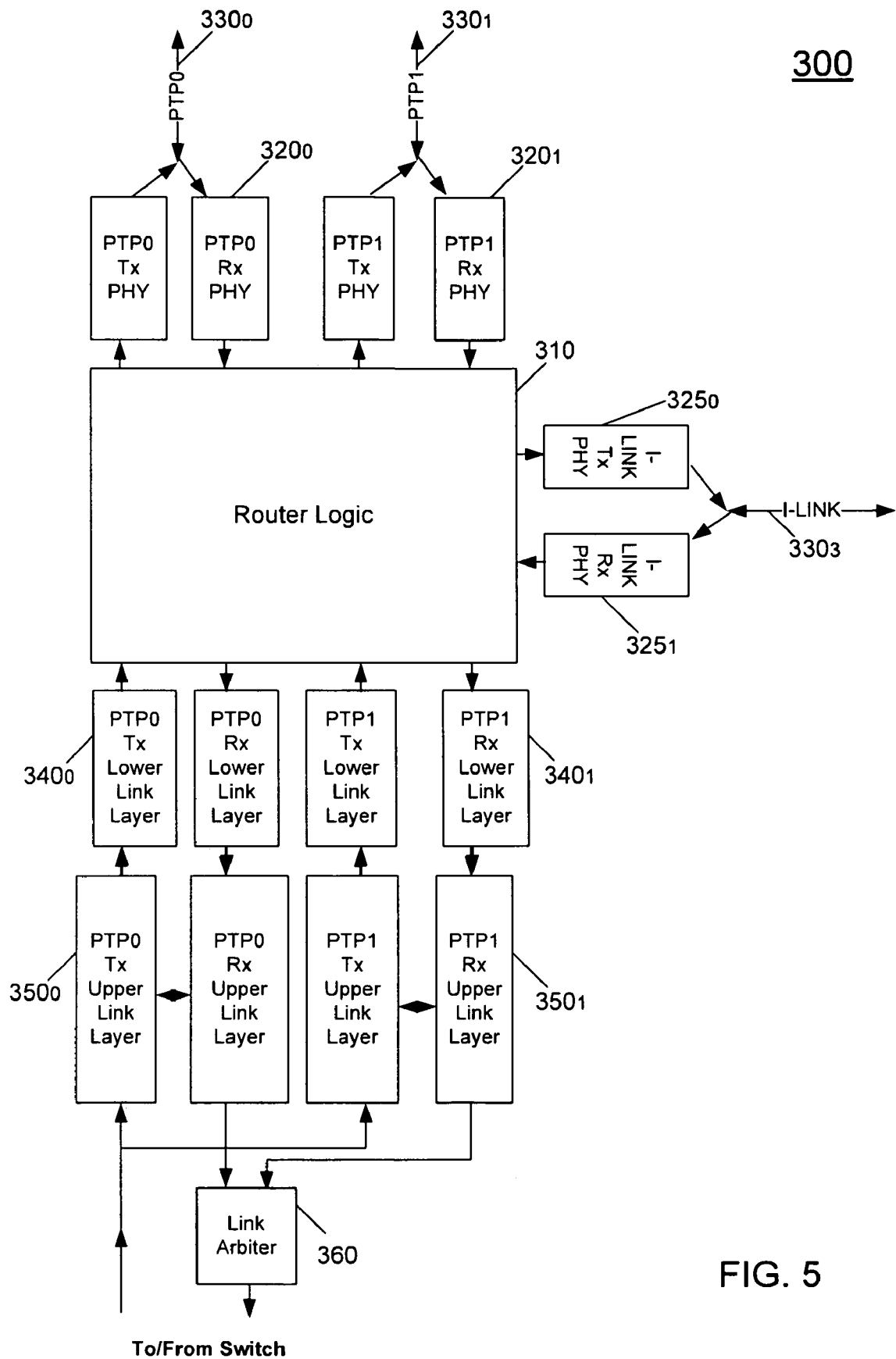
FIG. 5 is a block diagram of a link layer logic in accordance with one embodiment of the present invention.

Referring now to FIG. 5, shown is a block diagram of a link layer logic in accordance with one embodiment of the present invention. As shown in FIG. 5, link layer logic 300 may be separated into various layers, including an upper link layer $350_0$ and $350_1$, which may include upper link layer processing, as discussed above for both the transmit and receive directions for the off-package PtP links. As seen, upper link layer 350 is coupled to receive incoming transactions from a switch. In the downstream, i.e., receive direction, upper link layer 350 may be coupled to a link arbiter 360, which in turn may be coupled to the switch. In turn, upper link layer 350 is coupled to lower link layers $340_0$-$340_1$, again configured in the upstream and downstream direction to perform lower link layer processing, as discussed above.

Referring still to FIG. 5, in turn lower link layer 340 may be coupled to a router logic 310, which in turn is coupled to the physical layer of the given PtP links, namely physical layer logic $320_0$-$320_1$, which may be coupled to off-package PtP links $330_0$-$330_1$. As described above, such physical layer logic 320 may include full logic layer support for data transmission, e.g., via partial flit width connections. However, physical link layer logic $325_0$ and $325_1$, coupled to the intra-package link $330_3$ may be formed of a reduced physical layer, and may be of a wider width, e.g., a larger partial flit width or a full flit width, and may further operate at higher link speeds to enable transmission of greater bandwidths of information over I-link $330_3$.

That is, the third PtP link $330_3$ can be joined into an existing DP design by interjecting PTP router logic 310 at the lower link layer of each PTP link. In one embodiment, PtP router logic 310 may be a 5×5 flit-switch which purely operates in the flit-domain. Router logic 310 may also contain a PtP router table. Note that the remaining logic in the DP processor is oblivious to the existence of the third link, in fact it is oblivious to the number of links in the processor. A destination node-ID or a set of node-IDs is supplied to PtP router

TABLE 2

| Agent Name | Caching Agent-Chip0 | Home Agent-Chip0 | Caching Agent-Chip1 | Home Agent-Chip1 | PTP0 | PTP1 | PTP2 | PTP3 | I-LINK |
|---|---|---|---|---|---|---|---|---|---|
| Caching Agent-Chip0 | I | O | N | N | O | O | N | N | N |
| Home Agent-Chip0 | O | I | N | I | O | O | N | N | N |
| Caching Agent-Chip1 | N | N | I | O | N | N | O | O | N |
| Home Agent-Chip1 | N | I | N | I | N | N | O | O | N |
| PTP0 | O | O | N | N | I | N | N | N | N |
| PTP1 | O | O | N | N | N | I | N | N | N |
| PTP2 | N | N | O | O | N | N | I | N | N |
| PTP3 | N | N | O | O | N | N | N | I | N |
| I-LINK | N | N | N | N | N | N | N | N | I |

In various embodiments, link logic may be organized into upper link layer, lower link layer and PHY layer logic, both in the transmit (TX) and receive (RX) directions. Upper link layer logic performs the credit checks on the receiver, logic 310 and it can multi-cast the message appropriately based on the identifiers. In one embodiment, router logic 310 may be implemented as a full crossbar between all input and output ports. This approach has the advantage of being modular. In principle, a more optimal solution (in area and power) can be built by taking advantage of the connectivity in Table 2.

To implement an architecture in accordance with one embodiment of the present invention, system address decoder and protocol credit (RTID) management logic of the caching agent logic may be modified. A system address decoder in a DP processor is designed to address two home agents. To accommodate the systems of FIGS. 3A and 3B, the decoder may be expanded to support up to eight home agents. Hence the target node-ID field in the system address decoder may be three bits. The depth of interleave in a DP processor is usually eight and this should be sufficient for a MP processor. Secondly the caching agent logic in a DP processor has two RTID pools based on the destination target. Since there can be up to eight home agents in the MP processors, the number of pools may be eight.

As to the home agent logic, support for up to ten caching agents may be provided. DP processor logic supports three caching agents. In one embodiment, using highly interleaved home agents in the socket, the number of trackers in each home logic need not be changed. These same number of trackers may be repartitioned among larger number of caching agents. The home logic conflict resolution may also be extended to support the larger number of caching agent.

Note that from the caching agent and home agent view point, transaction flows to handle various memory transactions may be unchanged from the DP processor flows. The different elements of the architecture described above work together to make this possible.

Figure 6:
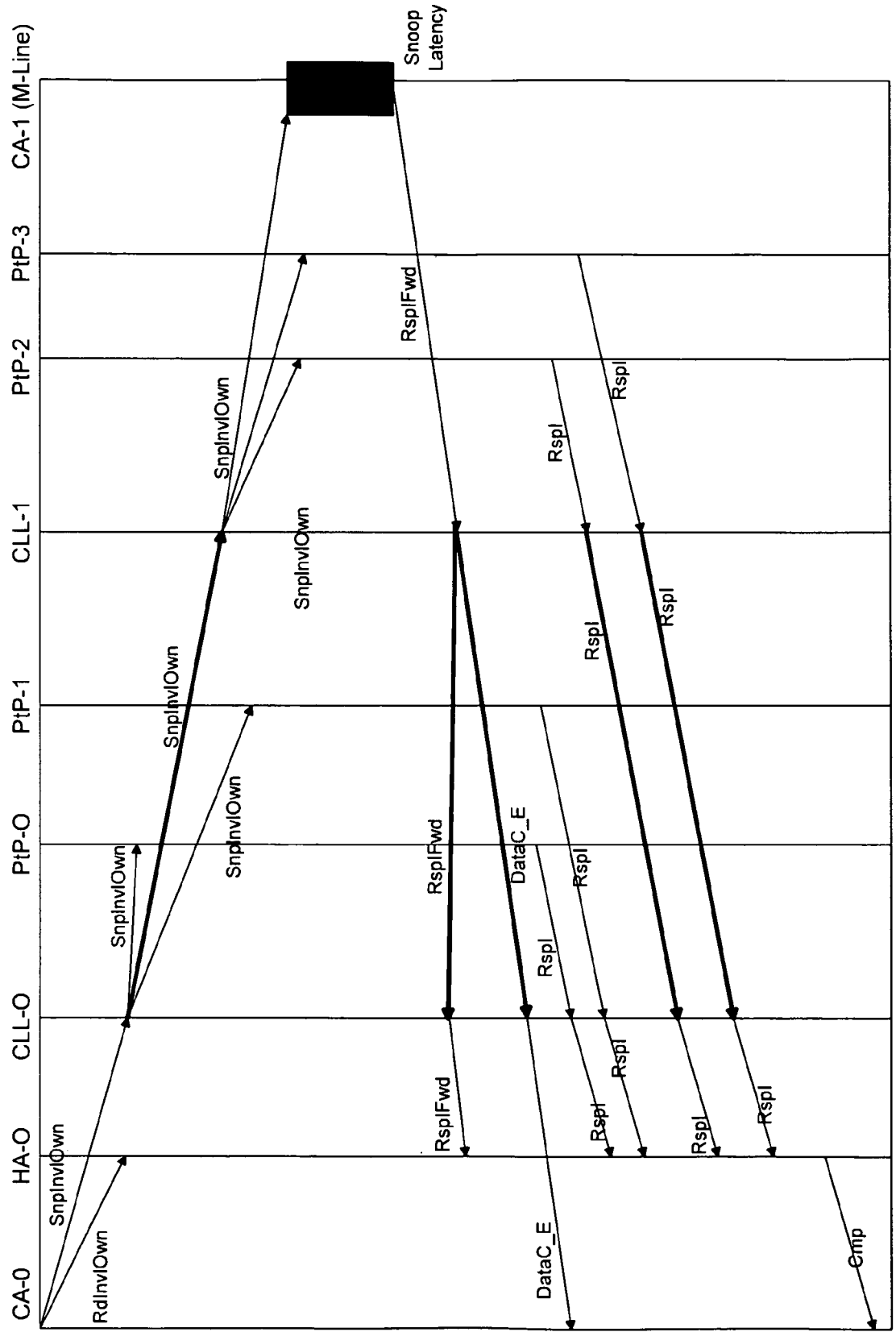
FIG. 6 is a transaction flow for a cache miss for a cache line that includes modified data in accordance with one embodiment of the present invention.

Referring now to FIG. 6, shown is a transaction flow for a cache miss for a cache line that includes modified data. As shown in FIG. 6, the transaction will begin from a caching agent of a first chip (i.e., chip 0) of a MCP. Various transactions are made to the different agents both within the first chip as well as to the second chip. As seen, the transactions in bold are those that travel along the I-link between the two chips of the MCP. To obtain ownership of the data, caching agent 0 transmits two messages to request ownership of the data, namely snoop invalidate own (SnpInvlOwn) and read invalidate own (RdInvlOwn) messages, which traverse to the various home agents and caching agents through the off-package links and the I-link such that the data is provided back to the caching agent, along with a completion, reflecting the receipt of all response messages at the corresponding home agent. What is noted is that the protocol agent view of the system is just as if there were 8 sockets in a partially connected topology. Each home agent waits for responses from 9-10 caching agents (based on configuration). On the socket at least half of these responses fly across the I-link. Performance estimates suggest that the I-link may be at least double the bandwidth of an off-package PtP. This can be addressed by the double wide bus running at flit clock, as described above.

Figure 7:
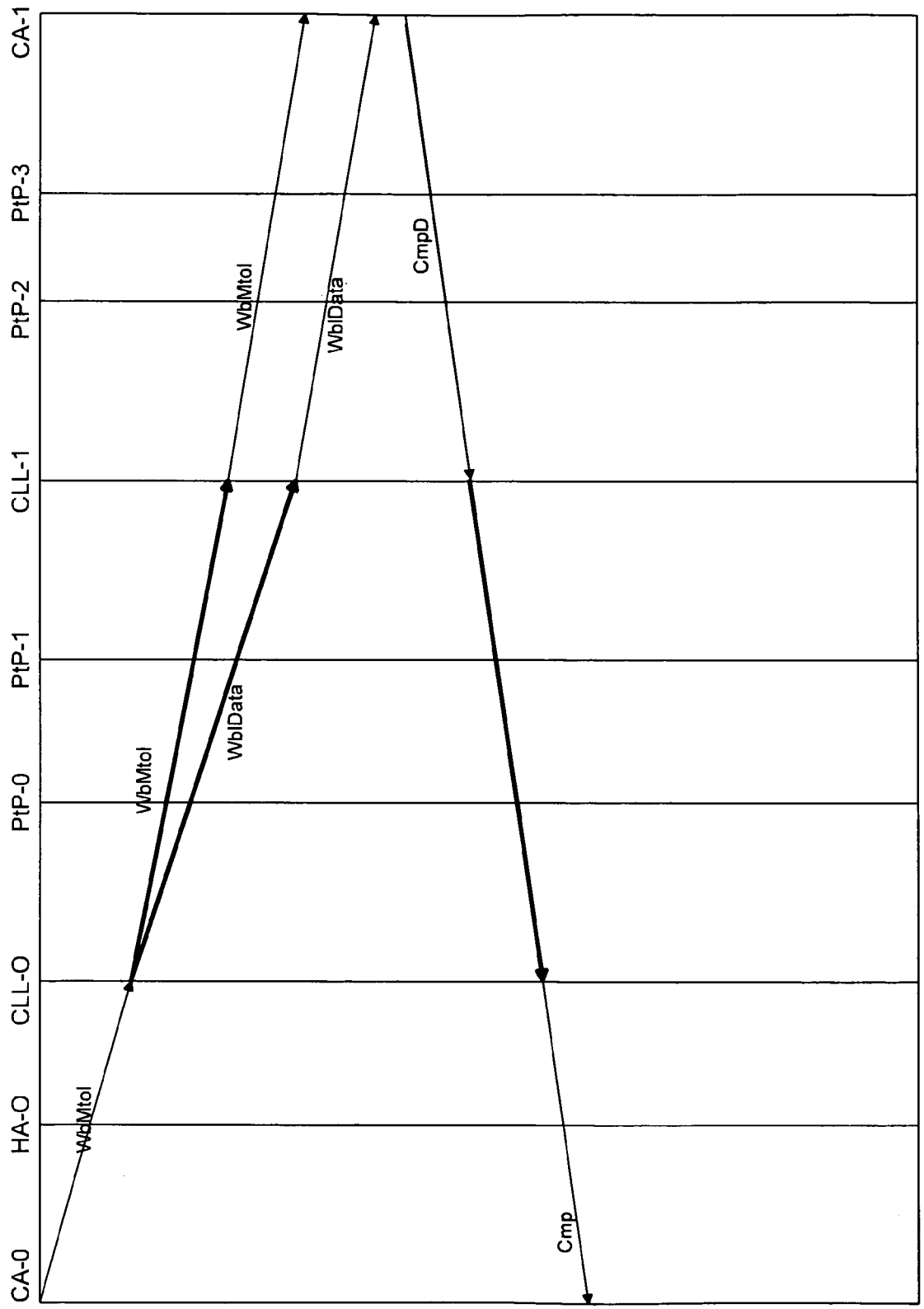
FIG. 7 is a transaction flow for a write back flow for modified data in accordance with one embodiment of the present invention.
Figure 8:
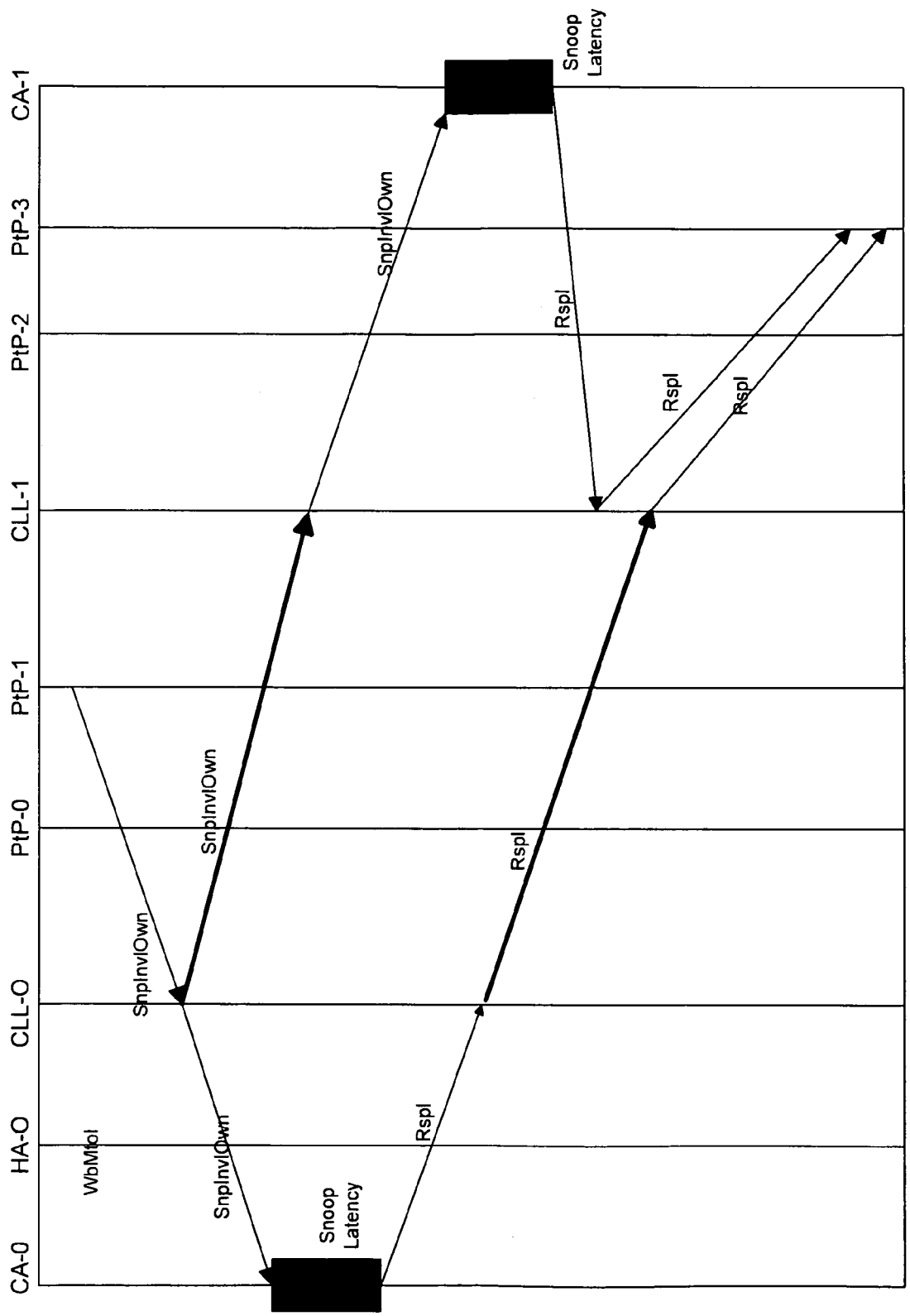
FIG. 8 is a transaction flow for an incoming snoop transaction in accordance with one embodiment of the present invention.

Similar flows are also shown in FIGS. 7 and 8 for handling a write back request and an incoming snoop request. As seen in FIG. 7, a writeback flow for writing modified writeback data from caching agent 0 to a home agent of the other chip of the MCP may occur so that the data is provided to the appropriate storage location, and the completion is reported back to caching agent 0. As to FIG. 8, shown is a transaction flow for handling an incoming snoop request for ownership of data received from an off-package link so the responses to this snoop request may be received and collected. As seen, in both of these flows various transactions proceed along the I-link while other transactions proceed off-package via the off-package PtP links. While shown with these particular examples, understand that the scope of the present invention is not limited in this regard and many other transaction flows may be realized using system architectures in accordance with an embodiment of the present invention.

While the architecture described above has been presented with the choice of creating an MP processor from DP processors, the same concepts can be used to build a DP processor from a previous generation DP processor or in fact a DP processor from uniprocessor (UP) processors.

By leveraging existing DP architectures for creating a MP processor, improvement in time-to-market (TTM) directly translates into competitiveness and cost savings.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first multi-chip package (MCP) including a first dual processor formed on a first semiconductor die and a second dual processor formed on a second semiconductor die, each of the first and second dual processors including: a plurality of cores;
a caching agent logic coupled to the plurality of cores;
a home agent logic coupled to the caching agent logic and to a memory controller of the corresponding dual processor; and
a link logic coupled to the home agent logic and the caching agent logic via a switch of the corresponding dual processor, wherein the link logic is to interface with a first point-to-point (PtP) link coupled between the first MCP and a first off-package agent, a second PtP link coupled between the first MCP and a second off-package agent, and a third PtP link coupled between the first and second dual processors of the first MCP, wherein the third PtP link is to operate at an independent bandwidth from the first and second PtP links to balance traffic.

2. The apparatus of claim 1, wherein the link logic includes a router logic coupled between physical layers each coupled to a respective one of the first and second PtP links and link layers each corresponding to one of the first and second PtP links, and further including a reduced physical layer coupled to the third PtP link and the router logic.

3. The apparatus of claim 2, wherein the router logic is to send a message based on a destination node identifier associated with the message.

4. The apparatus of claim 1, wherein the third PtP link comprises a plurality of conductive traces of a substrate to which the first semiconductor die and the second semiconductor die are coupled.

5. The apparatus of claim 4, wherein the first PtP link and the second PtP link comprise conductive traces of a circuit board to which the first MCP is coupled, and wherein a number of the conductive traces of the substrate forming the third PtP link is greater than a number of the conductive traces of the circuit board forming the first PtP link.

6. The apparatus of claim 1, wherein each caching agent logic of the first MCP comprises an independent caching domain.

7. The apparatus of claim 1, wherein the home agent logic of the first dual processor and the home agent logic of the second dual processor are exposed as a single home agent having a partitioned address space, and wherein the single home agent implements interleaving of trackers within the home agent logics.

8. The apparatus of claim 1, wherein the home agent logic of the first dual processor and the home agent logic of the second dual processor are exposed as independent home agents.

9. A system comprising:
   a first semiconductor device including a first dual processor and a second dual processor, each of the first and second dual processors including a plurality of cores, a caching agent logic coupled to the plurality of cores, a home agent logic coupled to the caching agent logic and to a memory controller of the corresponding dual processor, the home agent logic of the first dual processor and the home agent logic of the second dual processor exposed as a single home agent having a partitioned address space, and a link logic coupled to the home agent logic and the caching agent logic via a switch of the corresponding dual processor, wherein the link logic is to interface with a first intra-package point-to-point (PtP) link coupled between the first and second dual processors of the first semiconductor device and second and third PtP links, wherein the first intra-package PtP link is to operate at an independent bandwidth from the second and third PtP links coupled between the first semiconductor device and off-package agents;
   a second semiconductor device including a pair of dual processors and coupled to the first semiconductor device via the second PtP link;
   a memory partitioned into a first memory coupled to the first semiconductor device via a first memory PtP link and a second memory coupled to the second semiconductor device via a second memory PtP link, the first memory representing the partitioned address space; and
   an input/output (I/O) hub coupled to the first semiconductor device via the third PtP link and to the second semiconductor device via a fourth PtP link.

10. The system of claim 9, wherein the link logic includes a router logic coupled between physical layers each coupled to a respective one of the second and third PtP links and link layers each corresponding to one of the second and third PtP links, and further including a reduced physical layer coupled to the first intra-package PtP link and the router logic.

11. The system of claim 10, wherein the first intra-package PtP link comprises a plurality of conductive traces of a substrate to which a first semiconductor die including the first dual processor and a second semiconductor die including the second dual processor are coupled.

12. The system of claim 11, wherein the second and third PtP links comprise conductive traces of a circuit board to which the first semiconductor device and the second semiconductor device are coupled, and wherein a number of the conductive traces of the substrate forming the first intra-package PtP link is greater than a number of the conductive traces of the circuit board forming the second PtP link.

13. The system of claim 11, wherein the first semiconductor device is to send a request for ownership of first data from the caching agent to the home agent logic and send a snoop request for the first data from the caching agent to the link logic, wherein the link logic is to send the snoop request to the second semiconductor device via the second PtP link and send the snoop request to the link logic of the second dual processor of the first semiconductor device via the intra-package PtP link.

14. The system of claim 13, wherein the first semiconductor device is to receive a plurality of responses responsive to the snoop request in the home agent of the first semiconductor device, at least some of the responses received via the intra-package PtP link.

\* \* \* \* \*